US011956667B2

(12) United States Patent
Xu et al.

(10) Patent No.: US 11,956,667 B2
(45) Date of Patent: Apr. 9, 2024

(54) COMMUNICATION METHOD AND DEVICE

(71) Applicant: Huawei Technologies Co., Ltd., Shenzhen (CN)

(72) Inventors: Bin Xu, Beijing (CN); Bingzhao Li, Beijing (CN); Lei Chen, Beijing (CN); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 402 days.

(21) Appl. No.: 17/214,453

(22) Filed: Mar. 26, 2021

(65) Prior Publication Data

US 2021/0219174 A1 Jul. 15, 2021

Related U.S. Application Data

(63) Continuation of application No. PCT/CN2019/104982, filed on Sep. 9, 2019.

(30) Foreign Application Priority Data

Sep. 27, 2018 (CN) .......................... 201811133808.1

(51) Int. Cl.
*H04B 7/00* (2006.01)
*H04W 28/06* (2009.01)

(52) U.S. Cl.
CPC .................. *H04W 28/06* (2013.01)

(58) Field of Classification Search
CPC ..... H04W 24/00; H04W 28/06; H04W 28/04; H04W 84/18; H04W 76/02; H04L 29/06

(Continued)

(56) References Cited

U.S. PATENT DOCUMENTS

2007/0047547 A1* 3/2007 Conner ................. H04W 28/06
370/392
2009/0262687 A1 10/2009 Furata
(Continued)

FOREIGN PATENT DOCUMENTS

CN        101414969 A      4/2009
CN        102025737 A      4/2011
(Continued)

OTHER PUBLICATIONS

Nokia, Nokia, Shanghai Bell, "Scope refinement of Study on NR Industrial Internet of Things (IoT)," 3GPP TSG RAN meeting #81, Gold Coast, Australia, RP-181762, XP051550862, total 2 pages, 3rd Generation Partnership Project, Valbonne, France (Sep. 10-13, 2018).

(Continued)

*Primary Examiner* — Temica M Beamer
(74) *Attorney, Agent, or Firm* — Leydig, Voit & Mayer, Ltd.

(57) ABSTRACT

A communication method and a device are described to compress and decompress a data packet including an ethernet header to reduce radio transmission resources of an air interface. The communication method includes determining, by a sending device, a to-be-sent data packet. The to-be-sent data packet is a data packet including an ethernet header. The method further includes determining, by the sending device, a field to be compressed in the header of the to-be-sent data packet; and compressing, by the sending device, the header of the to-be-sent data packet according to a preset method. The preset method includes: removing the field to be compressed from the header of the data packet, or replacing the field to be compressed with a corresponding short field; and sending, by the sending device, a data packet obtained after the compressing.

12 Claims, 8 Drawing Sheets

(58) Field of Classification Search
USPC .......................................................... 370/310
See application file for complete search history.

(56) References Cited

U.S. PATENT DOCUMENTS

| | | | |
|---|---|---|---|
| 2011/0149848 A1* | 6/2011 | Ho | ........................... H04L 69/04 |
| | | | 370/328 |
| 2011/0158166 A1* | 6/2011 | Lee | ......................... H04L 69/04 |
| | | | 370/328 |
| 2013/0022032 A1 | 1/2013 | Taghavi Nasrabadi et al. | |
| 2015/0146729 A1 | 5/2015 | Babu et al. | |
| 2016/0359739 A1 | 12/2016 | Cox et al. | |

FOREIGN PATENT DOCUMENTS

| | | |
|---|---|---|
| CN | 103369593 A | 10/2013 |
| CN | 104079488 A | 10/2014 |
| CN | 105791459 A | 7/2016 |
| CN | 108200091 A | 6/2018 |
| JP | 2012169764 A | 9/2012 |
| JP | 2022511297 A | 1/2022 |
| KR | 20150060482 A | 6/2015 |
| KR | 20170071844 A | 6/2017 |
| WO | 2010106663 A1 | 9/2010 |
| WO | 2020048522 A1 | 3/2020 |

OTHER PUBLICATIONS

Ericsson, "On the scope of study for NR Industrial IoT study," 3GPP TSG-RAN #81, Gold Coast, Australia, Tdoc RP-181882, XP051551078, total 3 pages, 3rd Generation Partnership Project, Valbonne, France (Sep. 10-13, 2018).

"3rd Generation Partnership Project; Technical Specification Group Radio Access Network; NR;Packet Data Convergence Protocol (PDCP) specification(Release 15)", 3GPP TS 38.323 V15.2.0, total 26 pages, 3rd Generation Partnership Project, Valbonne, France (Jun. 2018).

"3rd Generation Partnership Project; Technical Specification Group Radio Access Network; NR;Radio Resource Control (RRC) protocol specification(Release 15)", 3GPP TS 38.331 V15.3.0, total 445 pages, 3rd Generation Partnership Project, Valbonne, France (Sep. 2018).

"3rd Generation Partnership Project; Technical Specification Group Radio Access Network; Evolved Universal Terrestrial Radio Access (E-UTRA); Packet Data Convergence Protocol (PDCP) specification(Release 15)", 3GPP TS 36.323 V15.4.0, total 52 pages, 3rd Generation Partnership Project, Valbonne, France (Jun. 2019).

"3rd Generation Partnership Project; Technical Specification Group Radio Access Network; Evolved Universal Terrestrial Radio Access (E-UTRA); Radio Resource Control (RRC);Protocol specification(Release 12)", 3GPP TS 36.331 V12.18.0, total 464 pages, 3rd Generation Partnership Project, Valbonne, France (Mar. 2019).

"Ethernet Header Compression," [online] 3GPP TSG-RAN WG2 #103bis, Chengdu, China, Tdoc R2-1814811, Total 8 pages, 3rd Generation Partnership Project, Valbonne, France (Oct. 8-12, 2018).

* cited by examiner

COMMUNICATION METHOD AND DEVICE

CROSS-REFERENCE TO RELATED APPLICATIONS

This application is a continuation of International Application No. PCT/CN2019/104982, filed on Sep. 9, 2019, which claims priority to Chinese Patent Application No. 201811133808.1, filed on Sep. 27, 2018. The disclosures of the aforementioned applications are hereby incorporated by reference in their entireties.

TECHNICAL FIELD

This application relates to the communications field, and more specifically, to a communication method and a device.

BACKGROUND

For a communications network, radio resources of an air interface are precious. To reduce the radio resources of the air interface, when a data packet is transmitted, the data packet may be compressed first, and then a data packet obtained after compression is transmitted. For example, a header of the data packet may be compressed.

In some communication scenarios, data packets are transmitted based on Ethernet formats during data communication. For example, in 5G communication, industrial communication is an important scenario. In the industrial communication, data packets are usually transmitted in Ethernet formats. However, currently, there is no compression method applicable to a data packet that includes an ethernet header.

SUMMARY

This application provides a communication method and a device, to compress and decompress a data packet including an ethernet header, thereby reducing radio transmission resources of an air interface.

According to a first aspect, a communication method is provided. The communication method includes: determining, by a sending device, a to-be-sent data packet, where the to-be-sent data packet is a data packet including an ethernet header; determining, by the sending device, a field to be compressed in the header of the to-be-sent data packet; compressing, by the sending device, the header of the to-be-sent data packet according to a preset method, where the preset method includes: removing the field to be compressed from the header of the data packet, or replacing the field to be compressed with a corresponding short field; and sending, by the sending device, a data packet obtained after the compressing.

In the solution provided in this application, the sending device compresses, according to the preset method, the data packet including the ethernet header, and the data packet obtained after the compressing is transmitted over an air interface, thereby reducing radio transmission resources of the air interface.

With reference to the first aspect, in a possible implementation of the first aspect, the communication method may further include: sending, by the sending device, header context information of the to-be-sent data packet to a receiving device, where the header context information includes at least one of the following: a complete header of the to-be-sent data packet; complete content of the field to be compressed; and a correspondence between the short field and the field to be compressed.

In this implementation, the sending device sends the header context information to the receiving device, so that the receiving device can decompress, based on the header context information, the received data packet obtained after compression.

In an implementation, if determining that the header context information of the data packet changes, the sending device sends header context change indication information to the receiving device. In this way, it can be ensured that the header context information on the sending device side is consistent with that on the receiving device side.

In an implementation, that the header context information changes includes: a rule in the header context information is deleted, a rule in the header context information is modified, or a new rule is added to the header context information, where one rule is used to indicate a correspondence between a short field and a field to be compressed.

In an implementation, determining that the rule in the header context is deleted includes: if no data packet corresponding to the rule is received within a specified time, determining that the rule is deleted.

With reference to the first aspect, in a possible implementation of the first aspect, the communication method may further include: before the sending device sends the data packet obtained after compression, receiving, by the sending device, first feedback information from the receiving device, where the first feedback information is used to indicate the sending device to start to compress the header of the data packet. In this manner, data compression may start to be performed after it is determined that the receiving device receives the header context information required for decompression.

In an implementation, the first feedback information includes first indication information, and the first indication information is used to indicate a compression level of header compression.

With reference to the first aspect, in a possible implementation of the first aspect, the communication method may further include: if determining that a specified condition is met, stopping, by the sending device, sending the data packet obtained after compression, and/or sending the header context information of the to-be-sent data packet to the receiving device again or adjusting a compression level of header compression, where the specified condition includes at least one of the following: second feedback information is received, where the second feedback information is used to indicate that decompression fails; and third feedback information is not received within a specified time, where the third feedback information is used to indicate that the header context information is valid in the receiving device.

With reference to the first aspect, in a possible implementation of the first aspect, the communication method may further include: before the sending device sends the data packet obtained after compression, sending second indication information to the receiving device, where the second indication information is used to indicate that the data packet is a compressed data packet; or a header of the data packet obtained after compression includes third indication information, and the third indication information is used to indicate that the data packet is a compressed data packet. In this way, the receiving device can determine, based on the second indication information or the third indication information, whether the data packet needs to be decompressed.

In an implementation, a header compression function for the data packet including the ethernet header is configured by the network device through radio resource control RRC signaling.

According to a second aspect, a communication method is provided. The communication method includes: receiving, by a receiving device, a first data packet, where the first data packet is a data packet including an ethernet header; and if the receiving device determines that the header of the first data packet is compressed, decompressing the first data packet according to a preset method, where the preset method includes: adding complete content of a compressed field to the header of the first data packet; or replacing a short field in the header of the first data packet with the complete content of the corresponding compressed field.

In the solution provided in this application, the sending device compresses, according to the preset method, the data packet including the ethernet header, and the data packet obtained after compression is transmitted over an air interface, thereby reducing radio transmission resources of the air interface. The receiving device may decompress the data packet according to a corresponding method.

With reference to the second aspect, in a possible implementation of the second aspect, the communication method may further include: receiving, by the receiving device, header context information of the first data packet, where the header context information includes at least one of the following: a complete header of the first data packet; the complete content of the field to be compressed; and a correspondence between the short field and the field to be compressed.

In this implementation, the receiving device receives the header context information, and may decompress, based on the header context information, the received data packet obtained after compression.

In an implementation, the communication method further includes: receiving, by the receiving device, header context change indication information, where the header context change indication information is used to indicate that the header context information of the data packet changes; and updating, by the receiving device, the locally stored header context information based on the header context change indication information. In this way, it can be ensured that the header context information on the sending device side is consistent with that on the receiving device side.

In an implementation, that the header context information changes includes: a rule in the header context information is deleted, a rule in the header context information is modified, or a new rule is added to the header context information, where one rule is used to indicate a correspondence between a short field and a field to be compressed.

In an implementation, the communication method further includes: if no data packet corresponding to the rule is received within a specified time, deleting the rule from the locally stored header context information.

With reference to the second aspect, in a possible implementation of the second aspect, the communication method may further include: sending, by the receiving device, first feedback information to a sending device, where the first feedback information is used to indicate the sending device to start to compress the header of the data packet. In this manner, data compression may start to be performed after it is determined that the receiving device receives the header context information required for decompression.

In an implementation, the first feedback information includes first indication information, and the first indication information is used to indicate a compression level of header compression.

With reference to the second aspect, in a possible implementation of the second aspect, the communication method may further include: sending, by the receiving device, second feedback information to the sending device, where the second feedback information is used to indicate that decompression fails.

With reference to the second aspect, in a possible implementation of the second aspect, the communication method may further include: sending, by the receiving device, third feedback information to the sending device, where the third feedback information is used to indicate that the header context information is valid in the receiving device.

In an implementation, the determining, by the receiving device, that the header of the first data packet is compressed includes: receiving second indication information before the receiving device receives the first data packet, where the second indication information is used to indicate that the first data packet is a compressed data packet, and determining, by the receiving device based on the second indication information, that the header of the first data packet is compressed; or determining, by the receiving device based on third indication information, that the header of the first data packet is compressed, where the third indication information is included in the header of the first data packet, and the third indication information is used to indicate that the first data packet is a compressed data packet.

In an implementation, a header compression function for the data packet including the ethernet header is configured by the network device through radio resource control RRC signaling.

According to a third aspect, a sending device is provided. The sending device is configured to perform the communication method in any one of the first aspect or the possible implementations of the first aspect. Specifically, the sending device may include a module configured to perform the communication method in any one of the first aspect or the possible implementations of the first aspect.

According to a fourth aspect, a sending device is provided. The sending device includes a memory and a processor, the memory is configured to store an instruction, the processor is configured to execute the instruction stored in the memory, and execution of the instruction stored in the memory enables the processor to perform the method in any one of the first aspect or the possible implementations of the first aspect.

According to a fifth aspect, a computer-readable storage medium is provided. The computer-readable storage medium stores a computer program, and when the program is executed by a processor, the method according to any one of the first aspect or the possible implementations of the first aspect is implemented.

According to a sixth aspect, a receiving device is provided. The receiving device is configured to perform the communication method in any one of the second aspect or the possible implementations of the second aspect. Specifically, the receiving device may include a module configured to perform the communication method in any one of the second aspect or the possible implementations of the second aspect.

According to a seventh aspect, a receiving device is provided. The receiving device includes a memory and a processor, the memory is configured to store an instruction, the processor is configured to execute the instruction stored in the memory, and execution of the instruction stored in the memory enables the processor to perform the method in any one of the second aspect or the possible implementations of the second aspect.

According to an eighth aspect, a computer-readable storage medium is provided. The computer-readable storage medium stores a computer program, and when the program is executed by a processor, the method in any one of the second aspect or the possible implementations of the second aspect is implemented.

DESCRIPTION OF ILLUSTRATIVE EXAMPLES

The following describes technical solutions of this application with reference to the accompanying drawings.

The technical solutions provided in this application may be applied to various communications systems, for example, a current 4G communications system, and a future evolved network such as a 5G communications system, for example, a long term evolution LTE) system, a long term evolution advanced (LTE-A) system, a new radio (NR) system, a cellular system related to the 3rd generation partnership project (3GPP), a public land mobile network (PLMN) system, a plurality of communications convergence systems, and other such communications systems. A plurality of application scenarios may be included. For example, scenarios such as machine to machine (M2M), device to machine (D2M), macro-micro communication, enhanced mobile internet (eMBB), ultra-reliable low-latency communication (uRLLC), and massive machine-type communications (mMTC) are included. These scenarios may include but are not limited to: a scenario of communication between user equipments (UE), a scenario of communication between network devices, a scenario of communication between a network device and UE, and the like.

Figure 1:
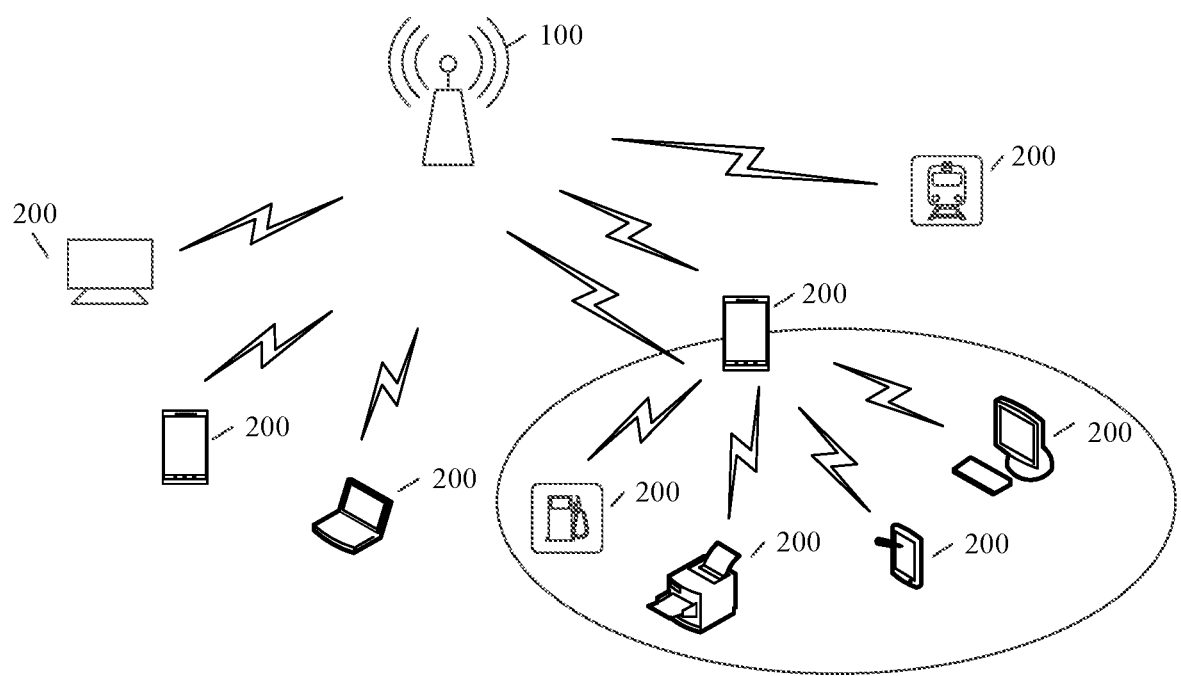
FIG. 1 is a schematic diagram of a system architecture to which an illustrative example of the present disclosure is applicable.

The technical solutions provided in the illustrative examples of this application may be applied to a system architecture shown in FIG. 1. The system architecture may include a network device 100 and one or more terminal devices 200 connected to the network device 100.

The network device 100 may be a device that can communicate with the terminal device 200. The network device 100 may be an eNB (evolutional NodeB) or an eNodeB in LTE. The network device 100 may alternatively be a relay station, an access point, or the like. The network device 100 may alternatively be a radio controller in a cloud radio access network (CRAN) scenario. The network device 100 may alternatively be a network device in a future 5G network or a network device in a future evolved network, or may be a wearable device, a vehicle-mounted device, or the like.

The network device 100 in this illustrative example of the present disclosure may also be referred to as a radio access network (RAN) device. The RAN device is connected to the terminal device, and is configured to receive data from the terminal device and send the data to a core network device. The RAN device corresponds to different devices in different communications systems. For example, the RAN device corresponds to a base station and a base station controller in a 2G system, corresponds to a base station and a radio network controller (RNC) in a 3G system, corresponds to an evolved NodeB (eNB) in a 4G system, and corresponds to a 5G system in the 5G system, for example, an access network device (e.g., a gNB, a CU, or a DU) in a new radio (NR) system.

The terminal device 200 may be a device that includes a wireless sending and receiving function and that can cooperate with the network device to provide a communication service for a user. Specifically, the terminal device 200 may be an Internet of Things terminal, an access terminal, a UE unit, a UE station, a mobile station, a mobile console, a remote station, a remote terminal, a mobile device, a UE terminal, a terminal, a wireless communications device, a UE agent, a UE apparatus, or the like. The Internet of Things terminal implements functions of collecting data and sending data to the network device 100, and is responsible for a plurality of functions such as data collection, preliminary processing, encryption, and transmission. The Internet of Things terminal may be a shared bicycle, a water meter, an electricity meter, a street lamp, a fire alarm device, a manhole cover, a gas station, a high-speed railway, a printer, or the like. The access terminal may be a cellular phone, a cordless phone, a session initiation protocol (SIP) phone, a wireless local loop (WLL) station, a personal digital assistant (PDA), a handheld device with a wireless communication function, a computing device or other processing devices connected to a wireless modem, a vehicle-mounted device, a wearable device, a terminal in a future 5G network, a terminal in a future evolved network, or the like. One or more of the terminal devices 200 may serve as a relay or a transit device for communication between another terminal device and the network device.

It should be noted that the system architecture shown in FIG. 1 is merely used as an example, and is not intended to limit the technical solutions of this application. A person skilled in the art should understand that in a specific implementation process, the system architecture may further include another device, and the network device 100 and the terminal device 200 may also be configured based on a specific requirement.

In the system architecture shown in FIG. 1, different encapsulation formats may be used for data transmission between communications devices, to adapt to requirements for different types of systems. For example, in conventional cellular network communication, data communication mostly complies with the internet protocol (IP), and a data packet is also transmitted based on an IP packet format. Different from a conventional cellular network, in a system, for example, in an industrial communication scenario, a data packet may be transmitted in Ethernet format. When data is transmitted between communications devices, a data packet may be compressed on a sending device side, and after receiving the data packet, a receiving device decompresses the data packet, to reduce transmission resources. Currently, there is no method for compressing/decompressing an ethernet header that can be used to implement a function of compressing/decompressing a data packet including an ethernet header. A method for compressing/decompressing a data packet in another format is not applicable to a data packet including an ethernet header. For example, because a header in IP format and an ethernet header have different structures, a method for compressing/decompressing a data packet in IP format for data packet transmission is not applicable to transmission of a data packet including an ethernet header.

For example, a structure of a data packet in Ethernet format is shown in Table 1.

TABLE 1

| Destination address | Source address | Length/Type | Data/Padding | CRC |

In Table 1, a destination address field and a source address field each have a length of 6 bytes, and represent a receiving address and a sending address of a data packet. For example, each network adapter (receiving device) has one 6-byte medium access control (MAC) address, and the address is used to uniquely identify the network adapter in the Ethernet. When receiving a data packet, the network adapter may determine, by comparing the destination address field with a MAC address of the network adapter, whether to receive the data packet. For example, a writing format of a 6-byte destination address is 00-01-02-03-04-05. The 6 bytes are sent from left to right in the Ethernet. For each byte, the least significant bit bit 0 is sent first, and the most significant bit bit 7 is sent last. Destination addresses may be classified into three types: unicast addresses, multicast addresses, and broadcast addresses. A unicast address usually corresponds to a MAC address of a specific network adapter and requires that bit 0 of the first byte is 0. A multicast address requires that bit 0 of the first byte is 1. In this way, a multicast address in a network is not the same as a MAC address of any network adapter, and multicast data can be received by a plurality of network adapters at the same time. All 48 bits of a broadcast address are all is (that is, FF-FF-FF-FF-FF-FF). All network adapters in a same local area network can receive broadcast data packets.

A length/type field has a length of 2 bytes, and indicates a length or a type of the data/padding field. If a value of the length/type field is less than 1518, it indicates the length of the data/padding field. If the value of the length/type field is greater than 1518, it indicates an upper-layer protocol to which the data packet in Ethernet format belongs (e.g., 0x800 represents an IP data packet, and 0x806 represents an address resolution protocol (ARP) data packet).

The length of the data/padding field ranges from 46 bytes to 1500 bytes.

A check sequence field cyclic redundancy code (CRC) field has a length of 4 bytes. The receiving device determines, based on the CRC field, whether a data packet is correctly transmitted. If it is determined that a data packet is incorrectly transmitted, the receiving device discards the data packet.

For example, a structure of a data packet in IP format is shown in Table 2.

TABLE 2

| 0 to 3 bytes | 4 to 7 bytes | 8 to 15 bytes | 16 to 18 bytes | 19 to 23 bytes | 24 to 31 bytes |
|---|---|---|---|---|---|
| Version | Header length | Differentiated service | Total length | | |
| Identifier | | | Flag | Fragment offset | |
| Survival time | | Protocol | Header checksum | | |
| Source address | | | | | |
| Destination address | | | | | |
| Optional field (variable length) | | | | | Padding |
| Data | | | | | |

A compression algorithm for a header in IP format is a complete algorithm and can identify only standard data packets in IP format. A data packet in IP format and a data packet in Ethernet format each are a numeric string including a series of 0 and 1. When a device processes a data packet, content that may be intuitively read by the device is only the numeric string including a series of 0 and 1. Therefore, different algorithm rules need to be formulated for different packet formats to indicate the device how to read and process a corresponding data packet type. Specifically, composition and a size of each field of the data packet and how to define a boundary of each field need to be clearly indicated. A type of a field is determined based on a boundary, a size, and composition of the field, so that a corresponding compression method is selected to compress fields in different packet formats or fields of different types in a same packet format. As shown above, a structure of a header in IP format is different from that of an ethernet header. If a compression algorithm for the header in IP format is used for the data packet in Ethernet format, and the data packet in Ethernet format is parsed based on an IP format, a boundary and a value in each field in the data packet cannot be identified. Consequently, after a parsing rule specific to an IP packet header compression algorithm is used in an Ethernet data packet, an incorrect compressed packet is generated, and a receive end cannot parse the packet. In addition, for a set of mature compression algorithms, not only a compression rule needs to be specifically formulated based on a characteristic of a packet format, but also a particular compression feedback mechanism and a particular application scenario are needed. The following describes a compression algorithm for a packet in Ethernet format in a communications system in an embodiment. An embodiment of this application provides a communication method, to compress and decompress a data packet including an ethernet header. In this embodiment of this application, the data packet including the ethernet header may be a data packet in Ethernet format, and a header of the data packet is an ethernet header. Alternatively, the data packet including the ethernet header may be a data packet obtained by combining a data packet in IP format and a data packet in Ethernet format, and a header of the data packet is an ethernet header. For example, the combination of the data packet in IP format and the data packet in Ethernet format may be that the data packet in Ethernet format is used as payload data of the data packet in IP format, or that the data packet in IP format is used as payload data of the data packet in Ethernet format.

The following explains and describes some terms in this application.

1. Field to be Compressed, Short Field

When a data packet including an ethernet header is compressed, a field to be compressed is a field to be compressed, and a data packet obtained after compression does not include the field to be compressed.

A short field is a field whose length is shorter than that of a field to be compressed. The short field may be used to indicate a field to be compressed. For example, a value of the short field may be an index or a context identifier. A short field may correspond to one or more field to be compresseds.

2. The term "a plurality of" in this specification means two or more. In this specification, the terms "first" and "second" are intended to distinguish between different objects but do not indicate a particular order of the objects. For example, "first feedback information" and "second feedback information" are used to distinguish different feedback information, but are not used to describe a particular order of the feedback information. The term "and/or" in this specification describes only an association relationship for describing associated objects and represents that three relationships may exist. For example, A and/or B may represent the following three cases: Only A exists, both A and B exist, and only B exists. In this specification, "I" represents an "or" relationship. For example, A/B may represent the following two cases: Only A exists, and only B exists.

In the embodiments of this application, the word "example" or "for example" is used to represent giving an example, an illustration, or a description. Any embodiment or design scheme described as "example" or "for example" in the embodiments of this application should not be construed as being more preferred or having more advantages than another embodiment or design scheme. Exactly, use of the word "example" or "for example" is intended to present a relative concept in a specific manner.

An embodiment of this application provides a communication method, applied to a scenario in which any two communications devices in the system architecture shown in FIG. 1 communicate with each other. A data packet transmitted between the two communications devices includes an ethernet header. When a communications device transmits a data packet including an ethernet header to another communications device, a device for sending the data packet may compress to-be-sent data packet, and send a data packet obtained after compression to a receiving device, to reduce transmission resources. The receiving device receives the data packet obtained after compression, and decompresses the compressed data packet according to a decompression method corresponding to a compression method of the sending device, to obtain a complete data packet. For example, in downlink transmission, the sending device is the network device 100 in FIG. 1, and the receiving device is the terminal device 200 in FIG. 1. Alternatively, in uplink transmission, the sending device is the terminal device 200 in FIG. 1, and the receiving device is the network device 100 in FIG. 1. Alternatively, both the sending device and the receiving device are the terminal device 200 in FIG. 1. Specific forms of the sending device and the receiving device are not limited in this embodiment of this application.

In the communication method in this embodiment of this application, a specific structure of an execution body of the sending device or the receiving device is not particularly limited in this embodiment of this application, provided that communication can be performed according to the communication method in this embodiment of this application by running a program that records code of the communication method in this embodiment of this application. For example, the communication method provided in this embodiment of this application may be performed by a network device or a terminal device, or may be performed by a function module that is in the network device or the terminal device and that can invoke and execute a program, or may be performed by an apparatus, for example, a chip, used in the network device or the terminal device. This is not limited in this application. In this specification, an example in which the network device and the terminal device perform the foregoing communication method is used for description.

Figure 2:
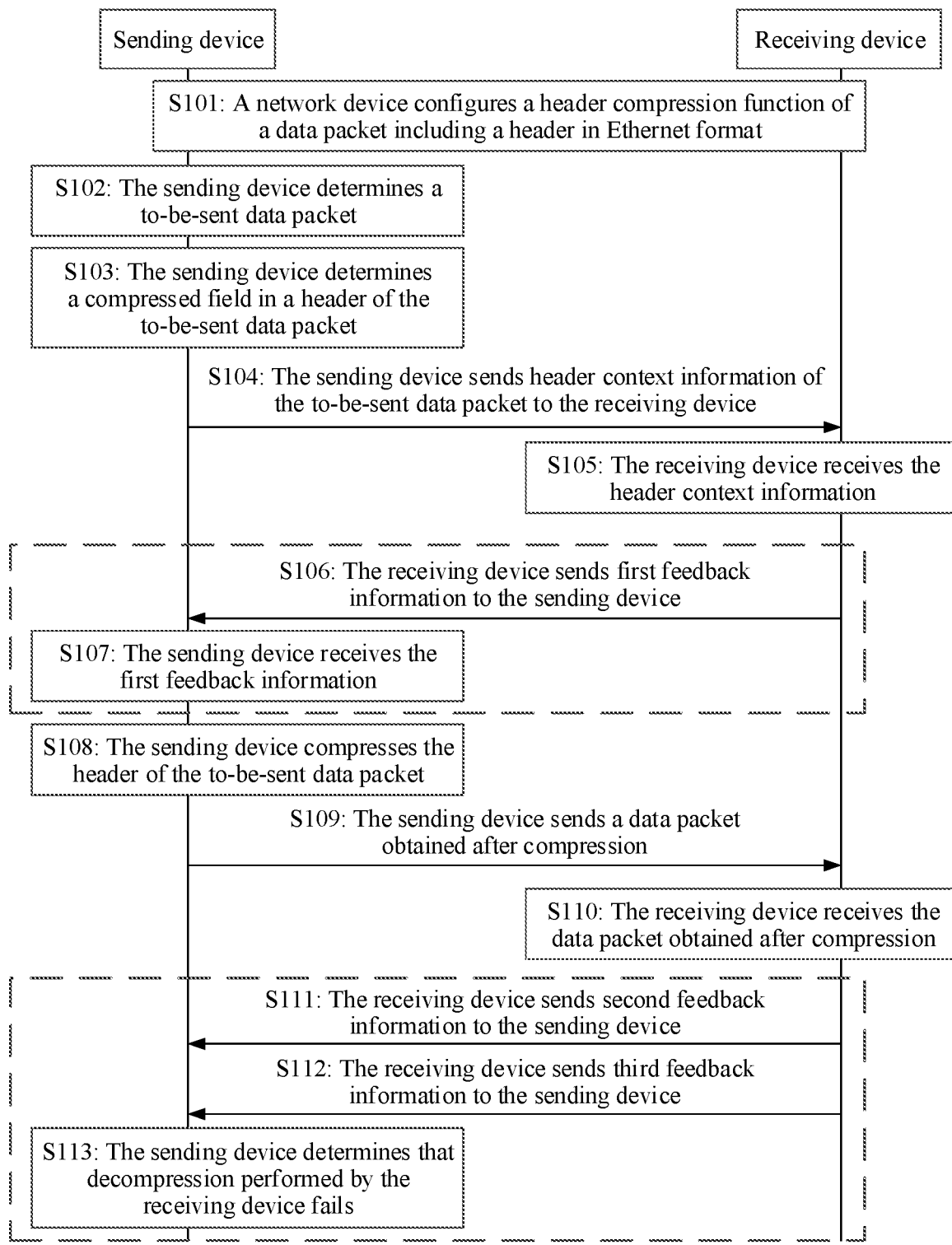
FIG. 2 is a schematic flowchart of a communication method according to an illustrative example of the present disclosure.

As shown in FIG. 2, the communication method provided in this embodiment of this application may include S101 to S113.

S101: A network device configures a header compression function of a data packet including an ethernet header.

In an implementation, the header compression function for the data packet including the ethernet header is configured by the network device. The network device determines, according to an indication of a core network device or according to a service requirement, that a channel that carries a service supports the header compression function for the data packet including the ethernet header. In an implementation, the core network device may choose to establish an IP-based channel or an Ethernet-based channel. When establishing different types of channels, the core network device may send indication information to the network device, to indicate the network device to compress the header of the data packet by using an IP packet header compression mechanism or an Ethernet packet header compression mechanism.

In an implementation, the network device may configure, through radio resource control (RRC) signaling, that a terminal device corresponding to the channel supports the header compression function for the data packet including the ethernet header. For example, the RRC signaling includes an information element used to indicate that the header compression function for the data packet including the ethernet header is supported, or a value of an information element that supports the header compression function for the data packet including the ethernet header is set to true. When the network device or the terminal device serves as a sending device and sends data, the network device or the terminal device may compress the to-be-sent data packet including the ethernet header.

S102: The sending device determines a to-be-sent data packet.

The sending device determines the to-be-sent data packet, where the to-be-sent data packet is a data packet including an ethernet header. For example, the sending device determines Q to-be-sent data packets to a receiving device, where Q>1. The Q data packets are data packets of a same service, and the Q data packets are in a format shown in Table 1. The Q data packets are sent to a same destination address and are sent from a same source address.

S103: The sending device determines a field to be compressed in a header of the to-be-sent data packet.

For example, in headers of the Q to-be-sent data packets, the destination address and the source address remain unchanged, the destination address and the source address in the header may be compressed, and the sending device determines that field to be compresseds are the destination address and the source address.

S104: The sending device sends header context information of the to-be-sent data packet to the receiving device.

The header context information includes indication information of a field of the header. After determining the to-be-sent data packet, the sending device may obtain complete information about the header of the to-be-sent data packet, and generate the header context information based on the complete information about the header. The sending device sends the header context information to the receiving device. In an implementation, the sending device and the receiving device locally store the obtained header context information. After receiving a data packet obtained after compression, the receiving device may obtain the complete information about the header of the compressed data packet based on the header context information. A manner in which the sending device sends the header context information to the receiving device may include: transferring the header context information through control signaling, transferring the header context information through the header of the to-be-sent data packet, or transferring the header context information through a dedicated data packet.

Figure 3:
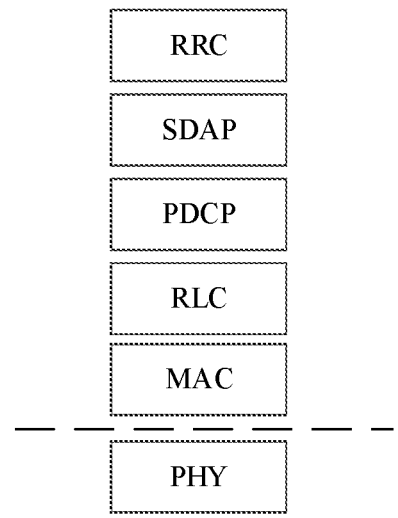
FIG. 3 is a schematic diagram of a protocol architecture of a communications device according to an illustrative example of the present disclosure.

For example, as shown in FIG. 3, the sending device or the receiving device may include protocol layers such as a radio resource control (RRC) layer, a service data adaptation protocol (SDAP) layer, a packet data convergence protocol (PDCP) layer, a radio link control (RLC) layer, a media access control (MAC) layer, and a physical layer (PHY). Transferring the header context information through the dedicated data packet may include: sending the header context information through a control protocol data unit (PDU) such as a PDCP control PDU, an SDAP control PDU, and the like.

The header context information may include at least one of the following: a complete header of the to-be-sent data packet; complete content of the field to be compressed; or a correspondence between a short field and the field to be compressed.

In an implementation, the header context information includes at least one rule, and one rule is used to indicate a correspondence between a short field and a field to be compressed. For example, one piece of header context information is shown in Table 3.

TABLE 3

| Rule sequence | Short field | Destination address | Source address |
| --- | --- | --- | --- |
| 1 | 00 | 00-01-02-03-04-05 | 10-01-08-03-04-05 |
| 2 | 01 | 00-02-03-04-05-06 | 00-F2-03-04-05-06 |
| 3 | 02 | 00-03-04-05-06-07 | 00-03-C4-05-09-07 |

For example, the first rule indicates that a field to be compressed corresponding to a short field 00 is a destination address 00-01-02-03-04-05 and a source address 10-01-08-03-04-05. The short field may be specified content shorter than the field to be compressed. For example, the short field may be a flow identifier (Flow ID) of the SDAP layer.

In an implementation, if the sending device determines that the header context information of the data packet changes, the sending device sends header context change indication information to the receiving device. The header context change indication information is used to indicate that the header context information of the data packet changes. The receiving device updates the locally stored header context information based on the header context change indication information.

In an implementation, the header context information includes the correspondence between the short field and the field to be compressed, and that the header context information changes includes: a rule in the header context information is deleted, a rule in the header context information is modified, or a new rule is added to the header context information.

For example, if the sending device determines that the header of the to-be-sent data packet includes a new destination address 02-03-09-05-06-01, and a corresponding source address is 00-03-C4-05-09-07, the sending device determines to add a new rule. For example, header context information after a rule 4 is added is shown in Table 4.

TABLE 4

| Rule sequence | Short field | Destination address | Source address |
| --- | --- | --- | --- |
| 1 | 00 | 00-01-02-03-04-05 | 10-01-08-03-04-05 |
| 2 | 01 | 00-02-03-04-05-06 | 00-F2-03-04-05-06 |
| 3 | 02 | 00-03-04-05-06-07 | 00-03-C4-05-09-07 |
| 4 | 08 | 02-03-09-05-06-01 | 00-03-C4-05-09-07 |

The sending device may send the header context change indication information to the receiving device through control signaling or a control PDU, to indicate that a new rule is added to the header context information. In an implementation, the sending device sends a piece of control signaling or a control PDU to the receiving device, where the control signaling or the control PDU includes content of the added new rule, and includes the short field and the field to be compressed. In another implementation, the sending device does not separately send control signaling or a control PDU to the receiving device to indicate that the new rule is added to the header context information. If the header of the data packet received by the receiving device includes the short field that is not stored in the local header context information, it is determined that the new rule is added. For example, the receiving device may send, to the sending device, feedback information for requesting the header context information corresponding to the short field, to obtain the added new rule.

For example, if determining that the rule in the header context information is modified, the sending device may send the header context change indication information to the receiving device through control signaling or a control PDU, to indicate that the rule in the header context information is modified, where the header context change indication information includes content of the modified rule.

For example, if determining that the rule in the header context information is deleted, the sending device may send the header context change indication information to the receiving device through control signaling or a control PDU, to indicate that the rule in the header context information is deleted. For example, a method for determining, by the sending device, that the rule in the header context information is deleted is as follows: When each rule is established, the sending device establishes a timer corresponding to the rule, and restarts the timer each time the sending device receives a data packet corresponding to the rule. If the data packet corresponding to the rule is not received within a specific time (the timer times out), it is determined that the rule is deleted. The data packet corresponding to the rule means that a header of the data packet includes the short field or the field to be compressed that is consistent with that in the rule. The receiving device locally deletes the rule based on the header context change indication information. In another implementation, the receiving device may alternatively establish, when each rule is established on the receiving device side, a timer corresponding to the rule, and restart the timer each time a data packet corresponding to the rule is received. If the data packet corresponding to the rule is not received within a specific time (the timer times out), the receiving device may locally delete the rule.

S105: The receiving device receives the header context information.

After receiving the header context information from the sending device, the receiving device may locally store the header context information.

Optionally, after receiving the header context information, the receiving device may perform S106.

S106: The receiving device sends first feedback information to the sending device.

The first feedback information is used to indicate the sending device to start to compress the header of the data packet.

In an implementation, the first feedback information includes first indication information, and the first indication information is used to indicate a compression level of header compression. For example, compression levels are classified into a first level, a second level, and a third level. For example, the first level indicates that one field is compressed, the second level indicates that two fields are compressed, and the third level indicates that three fields are compressed. Alternatively, for example, the first level indicates that w fields are compressed, the second level indicates that s fields are compressed, and the third level indicates that z fields are compressed, where 0≤w<s<z.

S107: The sending device receives the first feedback information.

S108: The sending device compresses the header of the to-be-sent data packet.

Optionally, if the sending device receives the first feedback information, the sending device starts to perform header compression on the data packet including the ethernet header. Optionally, in another implementation, if the sending device determines that the header compression function for the data packet including the ethernet header is configured, the sending device starts to perform header compression when the data packet needs to be sent. For example, when the sending device needs to send the data packet, the sending device first sends R pieces of header context information, and then starts to compress the header of the to-be-sent data packet.

The sending device compresses the header of the to-be-sent data packet based on a specified method, to obtain the data packet obtained after compression. A setting method may include: removing the field to be compressed from the header of the data packet, or replacing the field to be compressed with the corresponding short field.

In some embodiments, a method for compressing the header of the data packet is removing the field to be compressed from the header of the data packet.

For example, a data packet whose header format is a header shown in Table 1 is compressed, and the header before the compression includes three fields: a destination address (00-01-02-03-04-05), a source address (10-01-08-03-04-05), and a length/type (00-9C), and has 14 bytes in total. For example, the header may be represented in a form shown in Table 5, where one row represents one byte, and one cell represents one bit. It should be noted that Table is used to describe a quantity of bytes and a quantity of bits that are occupied by the fields in the header, and does not limit a form of the header of the data packet.

TABLE 5

| 0 | 0 | 0 | 0 | 0 | 0 | 0 | 0 |
|---|---|---|---|---|---|---|---|
| 0 | 0 | 0 | 0 | 0 | 0 | 0 | 1 |
| 0 | 0 | 0 | 0 | 0 | 0 | 1 | 0 |
| 0 | 0 | 0 | 0 | 0 | 0 | 1 | 1 |
| 0 | 0 | 0 | 0 | 0 | 1 | 0 | 0 |
| 0 | 0 | 0 | 0 | 0 | 1 | 0 | 1 |
| 0 | 0 | 0 | 1 | 0 | 0 | 0 | 0 |
| 0 | 0 | 0 | 0 | 0 | 0 | 0 | 1 |
| 0 | 0 | 0 | 0 | 1 | 0 | 0 | 0 |
| 0 | 0 | 0 | 0 | 0 | 0 | 1 | 1 |
| 0 | 0 | 0 | 0 | 0 | 1 | 0 | 0 |
| 0 | 0 | 0 | 0 | 0 | 1 | 0 | 1 |
| 0 | 0 | 0 | 0 | 0 | 0 | 0 | 0 |
| 1 | 0 | 0 | 1 | 1 | 1 | 0 | 0 |

For example, the field to be compressed is the destination address, and a header obtained after the compression includes two fields: the source address and the length/type, and has 8 bytes in total. The header may be represented in a form shown in Table 6.

TABLE 6

| 0 | 0 | 0 | 1 | 0 | 0 | 0 | 0 |
|---|---|---|---|---|---|---|---|
| 0 | 0 | 0 | 0 | 0 | 0 | 0 | 1 |
| 0 | 0 | 0 | 0 | 1 | 0 | 0 | 0 |
| 0 | 0 | 0 | 0 | 0 | 0 | 1 | 1 |
| 0 | 0 | 0 | 0 | 0 | 1 | 0 | 0 |
| 0 | 0 | 0 | 0 | 0 | 1 | 0 | 1 |
| 0 | 0 | 0 | 0 | 0 | 0 | 0 | 0 |
| 1 | 0 | 0 | 1 | 1 | 1 | 0 | 0 |

For example, the field to be compresseds are two fields: the destination address and the source address, and a header obtained after the compression includes one field: the length/type, and has 2 bytes in total. The header may be represented in a form shown in Table 7.

TABLE 7

| 0 | 0 | 0 | 0 | 0 | 0 | 0 | 0 |
|---|---|---|---|---|---|---|---|
| 1 | 0 | 0 | 1 | 1 | 1 | 0 | 0 |

For example, the field to be compresseds are three fields: the destination address, the source address, and the length/type, and the three fields in the header of the data packet are all compressed.

In some embodiments, a method for compressing the header of the data packet is replacing the field to be compressed with the corresponding short field.

For example, a header before the compression includes three fields: a destination address (00-01-02-03-04-05), a source address (10-01-08-03-04-05), and a length/type (00-9C). A correspondence between a short field and a field to be compressed is shown in Table 8. A length of the short field is one byte.

TABLE 8

| Short field | Destination address | Source address |
|---|---|---|
| 00 | 00-01-02-03-04-05 | 10-01-08-03-04-05 |
| 01 | 00-02-03-04-05-06 | 00-F2-03-04-05-06 |
| 02 | 00-03-04-05-06-07 | 00-03-C4-05-09-07 |

A data packet whose header format is the header shown in Table 1 is compressed. A header before the compression includes three fields: a destination address, a source address, and a length/type, and has 14 bytes in total. The field to be compresseds are two fields: the destination address and the source address. A header obtained after the compression includes two fields: the short field and the length/type, and has 3 bytes in total, as shown in Table 9.

TABLE 9

| 0 | 0 | 0 | 0 | 0 | 0 | 0 | 0 |
|---|---|---|---|---|---|---|---|
| 0 | 0 | 0 | 0 | 0 | 0 | 0 | 0 |
| 1 | 0 | 0 | 1 | 1 | 1 | 0 | 0 |

For example, a header before the compression includes three fields: a destination address (00-01-02-03-04-05), a source address (00-F2-03-04-05-06), and a length/type (00-9C). A correspondence between a short field and a field to be compressed is shown in Table 10. A length of the short field is 4 bytes, and a value range of the short field is 0 to 15.

TABLE 10

| Short field | Destination address | Source address |
|---|---|---|
| 0 | 00-01-02-03-04-05 | 10-01-08-03-04-05 |
| 1 | 00-02-03-04-05-06 | 00-F2-03-04-05-06 |
| 2 | 00-03-04-05-06-07 | 00-03-C4-05-09-07 |

A data packet whose header format is the header shown in Table 1 is compressed. A header before the compression includes three fields: a destination address, a source address, and a length/type, and has 14 bytes in total. The field to be compresseds are two fields: the destination address and the source address. A header obtained after the compression includes two fields: the short field and the length/type, and has 3 bytes in total, as shown in Table 11.

TABLE 11

| 0 | 0 | 0 | 0 | 0 | 0 | 0 | 1 |
|---|---|---|---|---|---|---|---|
| 0 | 0 | 0 | 0 | 0 | 0 | 0 | 0 |
| 1 | 0 | 0 | 1 | 1 | 1 | 0 | 0 |

For example, a header before the compression includes three fields: a destination address (00-01-02-03-04-05), a source address (00-F2-03-04-05-06), and a length/type (00-9C). A correspondence between a short field and a field to be compressed is shown in Table 12. A length of the short field is 2 bytes, and a value range of the short field is 0 to 3.

TABLE 12

| Short field | Length/Type |
|---|---|
| 0 | 00-9C |
| 1 | 08-00 |
| 2 | 08-06 |

A data packet whose header format is the header shown in Table 1 is compressed. A header before the compression includes three fields: a destination address, a source address, and a length/type, and has 14 bytes in total. The field to be compressed is a length/type. A header obtained after the compression includes three fields: a destination address, a source address, and a short field, and has 13 bytes in total, as shown in Table 13. The first bit and the second bit of the thirteenth byte are values of the short field, and the third bit to the eighth bit of the thirteenth byte are reserved bits.

TABLE 13

| 0 | 0 | 0 | 0 | 0 | 0 | 0 | 0 |
|---|---|---|---|---|---|---|---|
| 0 | 0 | 0 | 0 | 0 | 0 | 0 | 1 |
| 0 | 0 | 0 | 0 | 0 | 0 | 1 | 0 |
| 0 | 0 | 0 | 0 | 0 | 0 | 1 | 1 |
| 0 | 0 | 0 | 0 | 0 | 1 | 0 | 0 |
| 0 | 0 | 0 | 0 | 0 | 1 | 0 | 1 |
| 0 | 0 | 0 | 0 | 0 | 0 | 0 | 0 |
| 1 | 1 | 1 | 1 | 0 | 0 | 1 | 0 |
| 0 | 0 | 0 | 0 | 0 | 0 | 1 | 1 |
| 0 | 0 | 0 | 0 | 0 | 1 | 0 | 0 |
| 0 | 0 | 0 | 0 | 0 | 1 | 0 | 1 |
| 0 | 0 | 0 | 0 | 0 | 1 | 1 | 0 |
| 0 | 0 | 0 | 0 | 0 | 0 | 0 | 0 |

For example, a header before the compression includes three fields: a destination address (00-02-03-04-05-06), a source address (10-01-08-03-04-05), and a length/type (08-06). A correspondence between a short field and a field to be compressed is shown in Table 14. A length of the short field is 2 bytes, and a value range of the short field is 0 to 3.

TABLE 14

| Short field | Destination address | Source address | Length/Type |
|---|---|---|---|
| 0 | 00-01-02-03-04-05 | 10-01-08-03-04-05 | 00-9C |
| 1 | 00-02-03-04-05-06 | 00-F2-03-04-05-06 | 08-00 |
| 2 | 00-03-04-05-06-07 | 00-03-C4-05-09-07 | 08-06 |

A data packet whose header format is the header shown in Table 1 is compressed. A header before the compression includes three fields: a destination address, a source address, and a length/type, and has 14 bytes in total. The field to be compresseds are the destination address, the source address, and the length/type. A header obtained after the compression includes a short field, and has one byte in total, as shown in Table 15. The first bit and the second bit are values of a short field corresponding to the destination address, the third bit and the fourth bit are values of a short field corresponding to the source address, the fifth bit and the sixth bit are values of a short field corresponding to the length/type, and the seventh bit and the eighth bit are reserved bits.

TABLE 15

| 0 | 1 | 0 | 0 | 1 | 0 | 0 | 0 |
|---|---|---|---|---|---|---|---|

In an implementation, a compression function of a data packet including an ethernet header may be located at a PDCP layer. In another implementation, a compression function of a data packet including an ethernet header may be located at an SDAP layer. Alternatively, a compression function of a data packet including an ethernet header may be located at an RLC layer or a MAC layer. In another implementation, a compression function of a data packet including an ethernet header may also be located on a core network node, for example, a user plane function module (UPF).

S109: The sending device sends the data packet obtained after compression.

In an implementation, the sending device sends second indication information to the receiving device, where the second indication information is used to indicate that the sent data packet is a compressed data packet (e.g., the second indication information may indicate that N subsequently sent data packets are compressed data packets). Then, the sending device sends the data packet obtained after compression.

The second indication information may be a dedicated data packet, or control signaling (e.g., RRC signaling, physical uplink control channel (PUCCH) signaling, downlink control information (DCI), or the like). For example, the second indication information may be included in a PDCP packet header, an SDAP packet header, or an RLC/MAC data packet header.

In another implementation, the sending device sends the data packet obtained after compression, a header of the data packet obtained after compression includes third indication information, and the third indication information is used to indicate that the data packet is a compressed data packet.

S110: The receiving device receives the data packet obtained after compression.

The receiving device receives a first data packet, and the first data packet is a data packet including an ethernet header. After receiving the first data packet, the receiving device may determine, based on the second indication information or the third indication information, that the first data packet is a compressed data packet.

In an implementation, a compression method of the sending device is removing a field to be compressed from the header of the data packet. The sending device sends the data packet obtained after compression and corresponding header context information to the receiving device, where the header context information includes a complete header of the to-be-sent data packet or complete content of the field to be compressed. After receiving the data packet obtained after compression, the receiving device may add the complete header or the complete content of the field to be compressed to the header of the received data packet, and decompress the data packet.

In an implementation, a compression method of the sending device is replacing a field to be compressed with a corresponding short field. The sending device sends the data packet obtained after compression and corresponding header context information to the receiving device, where the header context information includes a correspondence between the short field and the field to be compressed. After receiving the data packet obtained after compression, the receiving device may replace the short field with complete content of the field to be compressed, and decompress the data packet.

Further, in an implementation, when determining that decompression fails, the receiving device performs S111 to send second feedback information to the sending device, where the second feedback information is used to indicate that decompression fails. For example, if the receiving device fails to decompress M data packets, it is determined that decompression fails, where M>0. For example, the receiving device fails to decompress the M consecutive data packets, or the receiving device fails to decompress the M data packets within a specified time.

In an implementation, the receiving device may send third feedback information to the sending device in a normal decompression process, where the third feedback information is used to indicate that the header context information is valid in the receiving device. For example, if the receiving device determines that no decompression fails, S112 is performed at intervals of specified duration to send the third feedback information to the sending device.

S111: The receiving device sends the second feedback information to the sending device.

S112: The receiving device sends the third feedback information to the sending device.

In an implementation, the receiving device may send the second feedback information or the third feedback information to the sending device through dedicated control signaling or a dedicated control PDU. For example, a dedicated PDCP control PDU is shown in Table 16.

TABLE 16

| D/C | PDU type | R<br>Data | R | R | R |
| --- | --- | --- | --- | --- | --- |

A D/C field is used to indicate whether the data packet is a control PDU or a data PDU. A PDU type field is used to indicate a type of the PDU. For example, the PDU type may be compression of a header in IP format, compression of an ethernet header, a status report, or the like. R indicates a reserved bit. Data may be information used for compression and decompression, such as a status feedback, header context information, or a correspondence between a short field and a field to be compressed, and may be used by the sending device and the receiving device to synchronize a compression status and compression information.

S113: The sending device determines that decompression performed by the receiving device fails.

In an implementation, if determining that a specified condition is met, the sending device stops sending the data packet obtained after compression, and/or sends the header context information of the to-be-sent data packet to the receiving device again or adjusts a compression level of header compression. The specified condition includes at least one of the following: the second feedback information is received; and the third feedback information is not received within a specified time. For example, when starting to execute the header compression function for the data packet including the ethernet header, the sending device starts a timer, if third feedback information is received before the timer times out, restarts the timer, and if the third feedback information is not received after the timer times out, determines that the receiving device fails to perform decompression.

According to the communication method provided in this embodiment of this application, the data packet including the ethernet header may be compressed and decompressed during data transmission, thereby reducing transmission resources.

The foregoing describes the communication method provided in the embodiments of the present disclosure, and the following describes a sending device and a receiving device provided in the embodiments of the present disclosure.

Figure 4:
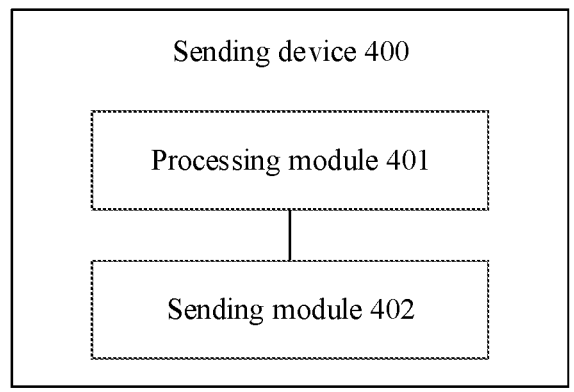
FIG. 4 is a schematic block diagram of a sending device according to an illustrative example of the present disclosure.

FIG. 4 is a schematic block diagram of a sending device 400 according to an illustrative example of the present disclosure. The sending device 400 includes: a processing module 401, configured to determine a to-be-sent data packet, where the to-be-sent data packet is a data packet including an ethernet header; the processing module 401 is further configured to determine a field to be compressed in the header of the to-be-sent data packet; and the processing module 401 is further configured to compress the header of the to-be-sent data packet according to a preset method, where the preset method includes: removing the field to be compressed from the header of the data packet, or replacing the field to be compressed with a corresponding short field; and a sending module 402, configured to send a data packet obtained after compression.

In an illustrative example, the sending module 402 is further configured to send header context information of the to-be-sent data packet to a receiving device, where the header context information includes at least one of the following: a complete header of the to-be-sent data packet;

the complete content of the field to be compressed; and a correspondence between the short field and the field to be compressed.

In an illustrative example, the processing module 401 is further configured to determine whether the header context information of the data packet changes; and the sending module 402 is further configured to: if the determining module 401 determines that the header context information of the data packet changes, send header context change indication information to the receiving device.

In an illustrative example, that the header context information changes includes: a rule in the header context information is deleted, a rule in the header context information is modified, or a new rule is added to the header context information, where one rule is used to indicate a correspondence between a short field and a field to be compressed.

Figure 5:
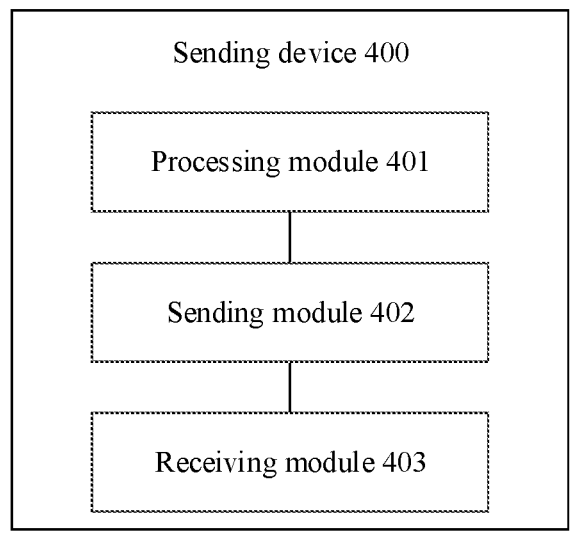
FIG. 5 is another schematic block diagram of a sending device according to an illustrative example of the present disclosure.

In an illustrative example, as shown in FIG. 5, the sending device 400 further includes a receiving module 403, configured to receive the data packet; and the processing module 401 is further configured to: if the receiving module 403 receives no data packet corresponding to the rule within a specified time, determine that the rule is deleted.

In an illustrative example, the receiving module 403 is configured to: before the sending module 402 sends the data packet obtained after compression, receive first feedback information from the receiving device, where the first feedback information is used to indicate the sending device to start to compress the header of the data packet.

In an illustrative example, the first feedback information includes first indication information, and the first indication information is used to indicate a compression level of header compression.

In an illustrative example, the processing module 401 is further configured to determine whether a specified condition is met, where the specified condition includes at least one of the following: second feedback information is received, where the second feedback information is used to indicate that decompression fails; and third feedback information is not received within a specified time, where the third feedback information is used to indicate that the header context information is valid in the receiving device; and the sending module 402 is further configured to: if the processing module 401 determines that a preset condition is met, stop sending the data packet obtained after compression, and/or send the header context information of the to-be-sent data packet to the receiving device again or adjust a compression level of header compression.

In an illustrative example, the sending module 402 is further configured to: before sending the data packet obtained after compression, send second indication information to the receiving device, where the second indication information is used to indicate that the data packet is a compressed data packet; or a header of the data packet obtained after compression includes third indication information, and the third indication information is used to indicate that the data packet is a compressed data packet.

It should be understood that the processing module 401 in this illustrative example of the present disclosure may be implemented by a processor or a processor-related circuit component, and the sending module 402 and the receiving module 403 may be implemented by a transceiver or a transceiver-related circuit component.

Figure 6:
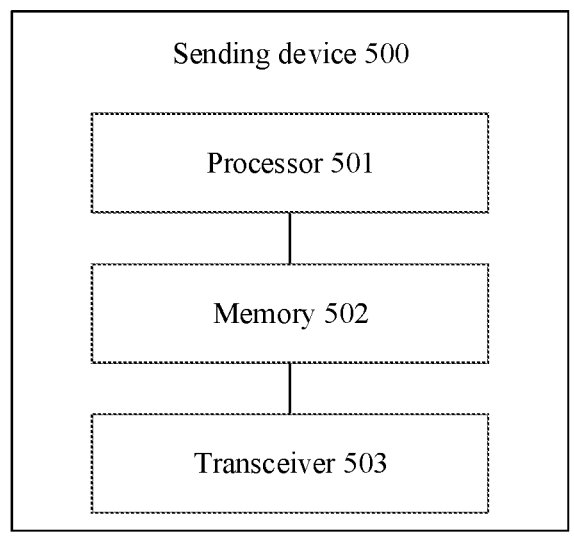
FIG. 6 is still another schematic block diagram of a sending device according to an illustrative example of the present disclosure.

As shown in FIG. 6, an illustrative example of the present disclosure further provides a sending device 500. The sending device 500 includes a processor 501, a memory 502, and a transceiver 503. The memory 502 stores an instruction or a program, and the processor 501 is configured to execute the instruction or the program stored in the memory 502. When the instruction or the program stored in the memory 502 is executed, the processor 501 is configured to perform an operation performed by the processing module 401 in the foregoing illustrative example, and the transceiver 503 is configured to perform operations performed by the sending module 402 and the receiving module 403 in the foregoing illustrative example.

It should be understood that the sending device 400 or the sending device 500 according to the illustrative examples of the present disclosure may correspond to the sending device in S101 to S113 in the communication method according to the illustrative examples of the present disclosure, and operations and/or functions of the modules in the sending device 400 or the sending device 500 can implement corresponding procedures of the method in FIG. 2. Details are not described herein again.

Figure 7:
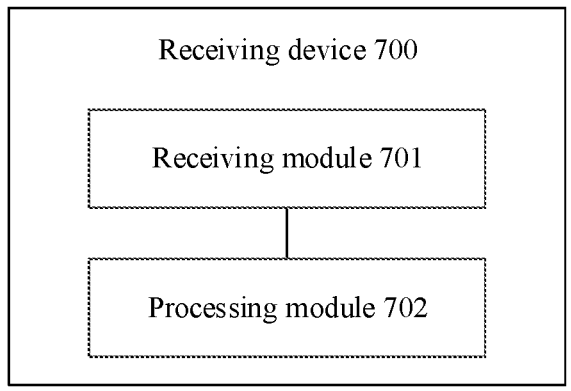
FIG. 7 is a schematic block diagram of a receiving device according to an illustrative example of the present disclosure.

FIG. 7 is a schematic block diagram of a receiving device 700 according to an illustrative example of the present disclosure. The receiving device 700 includes: a receiving module 701, configured to receive a first data packet, where the first data packet is a data packet including an ethernet header; and a processing module 702, configured to determine whether the header of the first data packet is compressed, where the processing module 702 is further configured to: if determining that the header of the first data packet is compressed, decompress the first data packet according to a preset method, where the preset method includes: adding complete content of a compressed field to the header of the first data packet; or replacing a short field in the header of the first data packet with the complete content of the corresponding compressed field.

In an illustrative example, the receiving module 701 is further configured to receive header context information of the first data packet, where the header context information includes at least one of the following: a complete header of the first data packet; the complete content of the field to be compressed; and a correspondence between the short field and the field to be compressed.

In an illustrative example, the receiving module 701 is further configured to receive header context change indication information, where the header context change indication information is used to indicate that the header context information of the data packet changes; and the processing module 702 is further configured to update the locally stored header context information based on the header context change indication information.

In an illustrative example, that the header context information changes includes: a rule in the header context information is deleted, a rule in the header context information is modified, or a new rule is added to the header context information, where one rule is used to indicate a correspondence between a short field and a field to be compressed.

In an illustrative example, the processing module 702 is further configured to: if the receiving module 701 receives no data packet corresponding to the rule within a specified time, delete the rule from the locally stored header context information.

Figure 8:
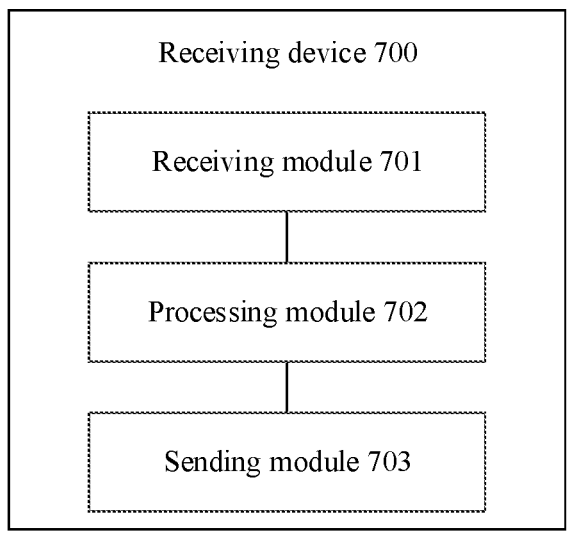
FIG. 8 is another schematic block diagram of a receiving device according to an illustrative example of the present disclosure.

In an illustrative example, as shown in FIG. 8, the receiving device further includes a sending module 703, configured to send first feedback information to a sending device, where the first feedback information is used to indicate the sending device to start to compress the header of the data packet.

In an illustrative example, the first feedback information includes first indication information, and the first indication information is used to indicate a compression level of header compression.

In an illustrative example, the sending module 703 is configured to send second feedback information to the sending device, where the second feedback information is used to indicate that decompression fails.

In an illustrative example, the sending module 703 is configured to send third feedback information to the sending device, where the third feedback information is used to indicate that the header context information is valid in the receiving device.

In an illustrative example, the receiving module 701 is further configured to: receive second indication information before receiving the first data packet, where the second indication information is used to indicate that the first data packet is a compressed data packet; the processing module 702 is further configured to determine, based on the second indication information, that the header of the first data packet is compressed; and the processing module 702 is further configured to determine, based on third indication information, that the header of the first data packet is compressed, where the third indication information is included in the header of the first data packet, and the third indication information is used to indicate that the first data packet is a compressed data packet.

It should be understood that the processing module 702 in this illustrative example of the present disclosure may be implemented by a processor or a processor-related circuit component, and the receiving module 701 and the sending module 703 may be implemented by a transceiver or a transceiver-related circuit component.

Figure 9:
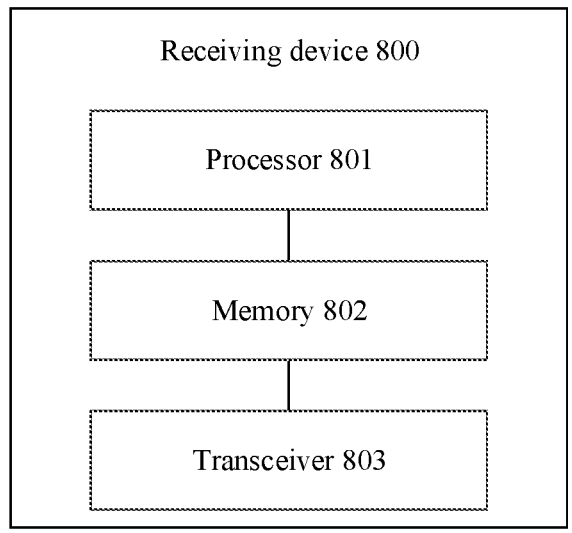
FIG. 9 is still another schematic block diagram of a receiving device according to an illustrative example of the present disclosure.

As shown in FIG. 9, an illustrative example of the present disclosure further provides a receiving device 800. The receiving device 800 includes a processor 801, a memory 802, and a transceiver 803. The memory 802 stores an instruction or a program, and the processor 801 is configured to execute the instruction or the program stored in the memory 802. When the instruction or the program stored in the memory 802 is executed, the processor 801 is configured to perform an operation performed by the processing module 702 in the foregoing illustrative example, and the transceiver 803 is configured to perform operations performed by the receiving module 701 and the sending module 703 in the foregoing illustrative example.

It should be understood that the receiving device 700 or the receiving device 800 according to the illustrative examples of the present disclosure may correspond to the receiving device in S101 to S113 in the communication method according to the illustrative examples of the present disclosure, and operations and/or functions of the modules in the receiving device 700 or the receiving device 800 can implement corresponding procedures of the method in FIG. 2. Details are not described herein again.

An illustrative example of the present disclosure further provides a computer-readable storage medium. The computer-readable storage medium stores a computer program, and when the program is executed by a processor, a procedure related to the sending device in the communication method provided in the foregoing method illustrative examples may be implemented.

An illustrative example of the present disclosure further provides a computer-readable storage medium. The computer-readable storage medium stores a computer program, and when the program is executed by a processor, a procedure related to the receiving device in the communication method provided in the foregoing method illustrative examples may be implemented.

An illustrative example of this application further provides a communications apparatus. The communications apparatus may be a terminal device or a circuit. The communications apparatus may be configured to perform an action performed by the terminal device in the foregoing method illustrative examples. The terminal device may be the sending device or the receiving device in the foregoing method illustrative examples.

Figure 10:
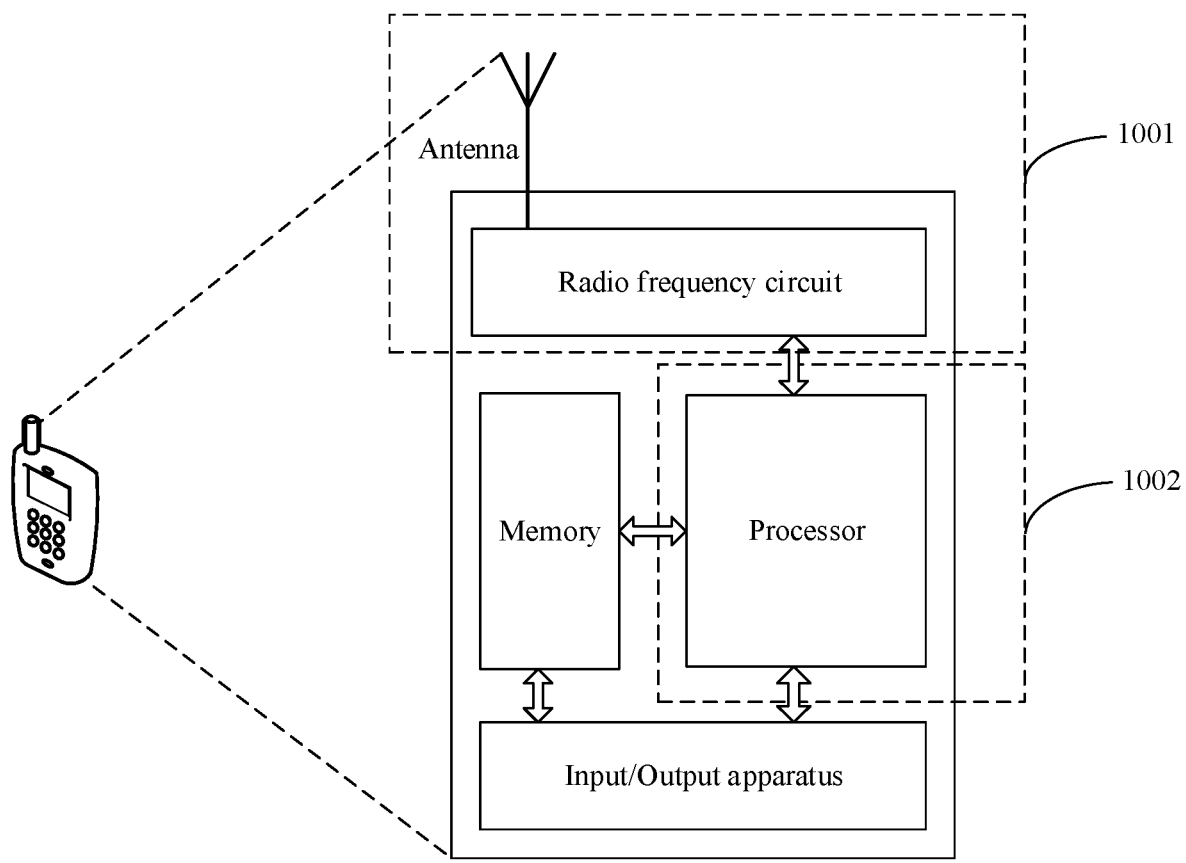
FIG. 10 is a schematic block diagram of a communications apparatus according to an illustrative example of this application.

When the communications apparatus is a terminal device, FIG. 10 is a simplified schematic structural diagram of a terminal device. For ease of understanding and illustration, in FIG. 10, an example in which the terminal device is a mobile phone is used. As shown in FIG. 10, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, such as a touchscreen, a display screen, and a keyboard, is mainly configured to receive data input by a user and output data to the user. It should be noted that some types of terminal devices may not have an input/output apparatus.

When data needs to be sent, the processor performs baseband processing on to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this illustrative example of this application.

In this illustrative example of this application, the antenna and the radio frequency circuit that have a transceiver function may be considered as a transceiver unit of the terminal device, and the processor having a processing function may be considered as a processing unit of the terminal device. As shown in FIG. 10, the terminal device includes a transceiver unit 1001 and a processing unit 1002. The transceiver unit may also be referred to as a transceiver machine, a transceiver, a transceiver apparatus, or the like. The processing unit may also be referred to as a processor, a processing board, a processing module, a processing apparatus, or the like. Optionally, a component that is in the transceiver unit 1001 and that is configured to implement a receiving function may be considered as a receiving unit, and a component that is in the transceiver unit 1001 and that is configured to implement a sending function may be considered as a sending unit. In other words, the transceiver unit 1001 includes the receiving unit and the sending unit. The transceiver unit sometimes may also be referred to as a transceiver, a transceiver machine, a transceiver circuit, or the like. The receiving unit may also be sometimes referred to as a receiver, a receiver machine, a receiver circuit, or the like. The sending unit may also be sometimes referred to as a transmitter, a transmitter machine, a transmitter circuit, or the like.

It should be understood that the transceiver unit 1001 is configured to perform a sending operation and a receiving operation on a terminal device side in the foregoing method illustrative examples, and the processing unit 1002 is configured to perform an operation other than the sending operation and the receiving operation on the terminal device in the foregoing method illustrative examples.

For example, in an implementation, the transceiver unit 1001 is configured to perform a sending operation on the terminal device side in S104, S106, S109, S111, or S1121, or a receiving operation on the terminal device side in S105, S107, or S110 in FIG. 2, and/or the transceiver unit 1001 is further configured to perform other sending and receiving steps on the terminal device side in the illustrative examples of this application. The processing unit 1002 is configured to perform S102, S103, S108, or S113 in FIG. 2, and/or the processing unit 1002 is further configured to perform another processing step on the terminal device side in the illustrative examples of this application.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 11:
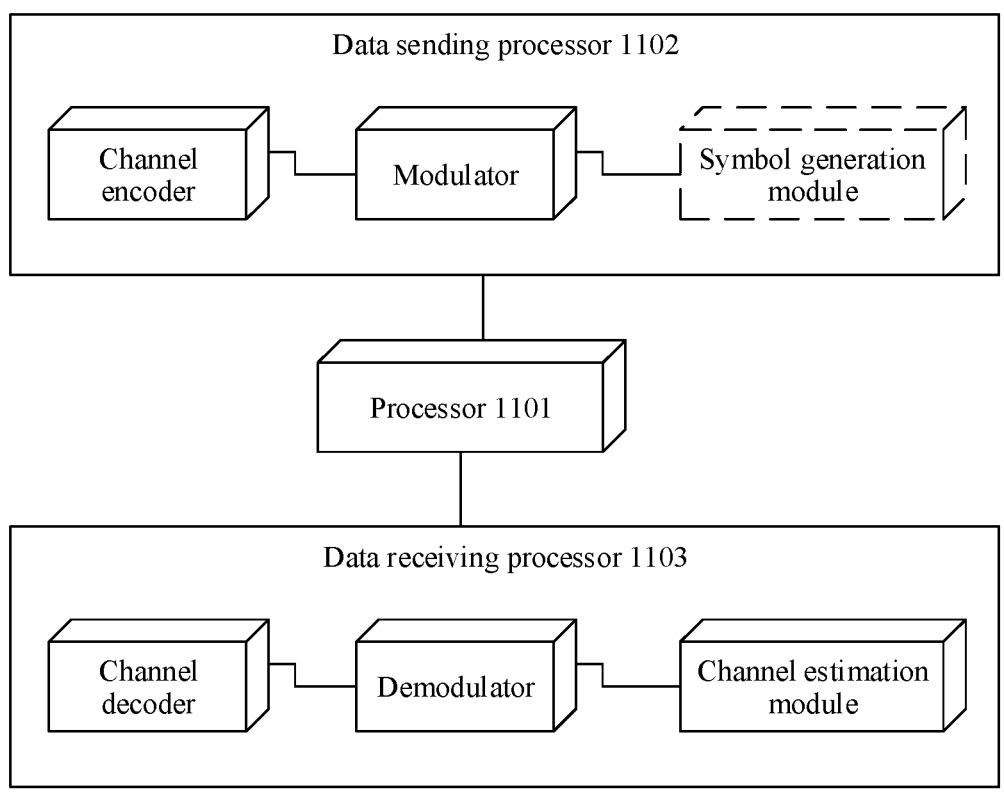
FIG. 11 is another schematic block diagram of a communications apparatus according to an illustrative example of this application.

When the communications apparatus in this illustrative example is a terminal device, refer to a device shown in FIG. 11. In an example, the device can complete a function similar to a function of the processor 501 in FIG. 6 or the processor 801 in FIG. 9. In FIG. 11, the device includes a processor 1101, a data sending processor 1102, and a data receiving processor 1103. The processing module 710 in the foregoing illustrative example may be the processor 1101 in FIG. 11, and completes a corresponding function. The sending module 402 and the sending module 703 in the foregoing illustrative examples may be the data sending processor 1102 in FIG. 11, and the receiving module 403 and the receiving module 701 may be the data receiving processor 1103 in FIG. 11. Although FIG. 11 shows a channel encoder and a channel decoder, it may be understood that the modules do not constitute a limitation on this illustrative example, and are merely examples.

Figure 12:
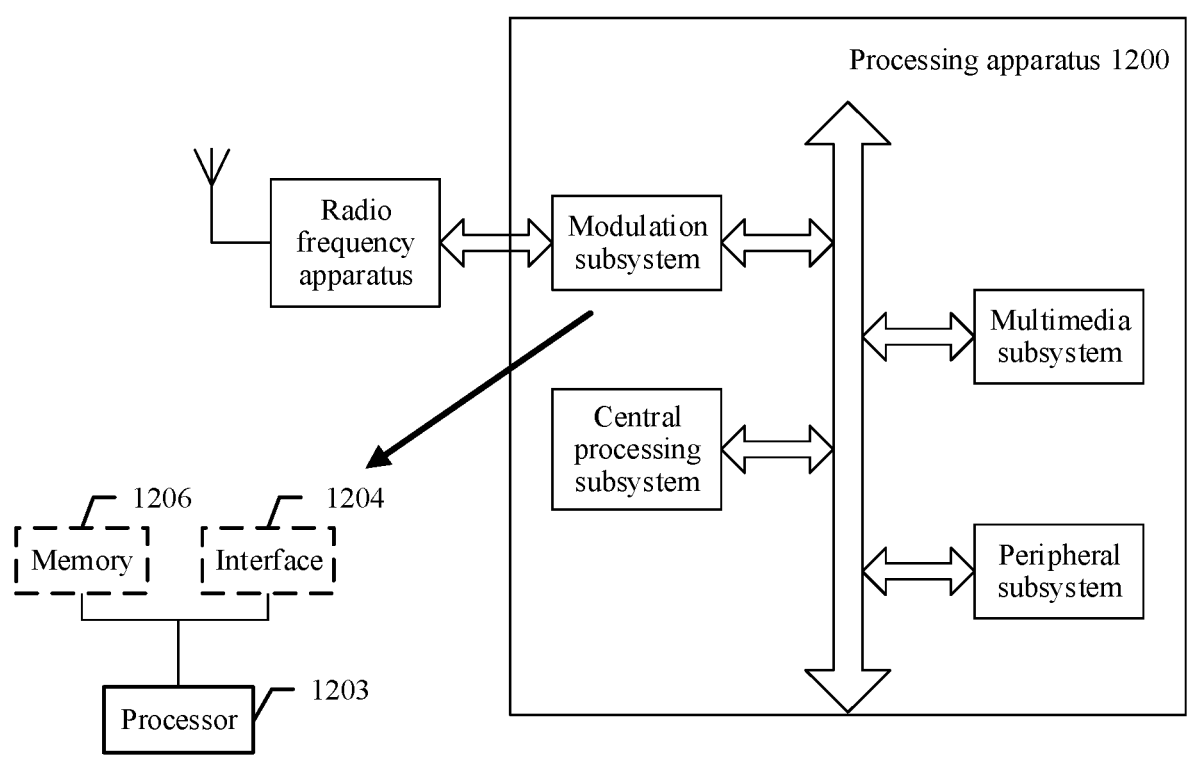
FIG. 12 is still another schematic block diagram of a communications apparatus according to an illustrative example of this application.

FIG. 12 shows another form of this illustrative example. A processing apparatus 1200 includes modules such as a modulation subsystem, a central processing subsystem, and a peripheral subsystem. The communications apparatus in this illustrative example may be used as the modulation subsystem in the processing apparatus 1200. Specifically, the modulation subsystem may include a processor 1203 and an interface 1204. The processor 1203 completes a function of the processing module 401 or the processing module 702, and the interface 1204 completes a function of the sending module 402, the receiving module 403, the receiving module 701, or the sending module 703. In another variant, the modulation subsystem includes a memory 1206, a processor 1203, and a program that is stored in the memory 1206 and that can be run on the processor. When executing the program, the processor 1203 implements the method on the terminal device side in the foregoing method illustrative examples. It should be noted that the memory 1206 may be nonvolatile or volatile. The memory 1206 may be located in the modulation subsystem, or may be located in the processing apparatus 1200, provided that the memory 1206 can be connected to the processor 1203.

In another form of this illustrative example, a computer-readable storage medium is provided. The computer-readable storage medium stores an instruction, and when the instruction is executed, the method on the terminal device side in the foregoing method illustrative examples is performed.

In another form of this illustrative example, a computer program product including an instruction is provided. When the instruction is executed, the method on the terminal device side in the foregoing method illustrative examples is performed.

For explanations and beneficial effects of related content in any one of the sending device, the receiving device, the communications apparatus, the terminal device, the computer-readable storage medium, and the computer program product provided above, refer to the corresponding method illustrative examples provided above. Details are not described herein again.

It should be understood that the processor mentioned in the illustrative examples of the present disclosure may be a central processing unit (CPU), or may be another general-purpose processor, a digital signal processor (DSP), an application-specific integrated circuit (ASIC), a field programmable gate array (FPGA) or another programmable logic device, discrete gate or transistor logic device, discrete hardware component, or the like. The general-purpose processor may be a microprocessor, or the processor may be any conventional processor or the like.

It should further be understood that the memory in the illustrative examples of the present disclosure may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (double data rate SDRAM, DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various illustrative examples of this application. The execution sequences of the processes should be determined according to functions and internal logic of the processes, and should not be construed as any limitation on the implementation processes of the illustrative examples of the present disclosure.

A person of ordinary skill in the art may be aware that, in combination with units and algorithm steps of the examples described in the illustrative examples disclosed in this specification, this application can be implemented by electronic hardware or a combination of computer software and electronic hardware. Whether the functions are performed by hardware or software depends on particular applications and design constraints of the technical solutions. A person skilled in the art may use different methods to implement the described functions for particular applications, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method illustrative examples, and details are not described herein again.

In the several illustrative examples provided in this application, it should be understood that the disclosed system, apparatus, and method may be implemented in other manners. For example, the described apparatus illustrative examples are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located at one position, or may be distributed on a plurality of network units. Some or all of the units may be selected based on actual requirements to achieve the objectives of the solutions of the illustrative examples.

In addition, function units in the illustrative examples of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in the form of a software product. The computer software product is stored in a storage medium and includes several instructions for instructing a computer device (which may be a personal computer, a server, or a network device) to perform all or some of the steps of the methods described in the illustrative examples of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method carried out on a sending device, the method comprising:
   determining a to-be-sent data packet that is a data packet comprising an ethernet header, wherein a header compression function for compressing a header of the to-be-sent data packet is carried out at a packet data convergence protocol (PDCP) layer, and wherein the header compression function is configured by a radio resource control (RRC) signaling;
   determining a field to be compressed in the header of the to-be-sent data packet, wherein the field to be compressed comprises a destination address field, a source address field and a length/type field;
   compressing the header of the to-be-sent data packet according to a preset method in the PDCP layer, wherein the preset method comprises:
      removing the field to be compressed from the header of the to-be-sent data packet, or
      replacing the field to be compressed with a context identifier of the header of the to-be-sent data packet; and
   sending a data packet obtained after the compressing the header of the to-be-sent data Packet,
   wherein, before sending the data packet, the method further comprises:
   receiving, from a receiving device, first feedback information for ethernet header context compression;
   wherein sending a data packet comprises:
   after receiving the first feedback information from the receiving device, start to transmit the to-be-sent data packet of which the header is compressed.

2. The method according to claim 1, wherein the method further comprises:
   sending the header context information of the to-be-sent data packet to the receiving device, wherein the header context information comprises complete content of the field to be compressed.

3. The method according to claim 1, wherein a header of the data packet obtained after compressing comprises third indication information indicating that the data packet is a compressed data packet.

4. A communication method carried out by a receiving device, the method comprising:
   sending first feedback information to a sending device that indicates to the sending device to start to transmit a to-be-sent data packet of which the header is compressed;
   receiving, after the sending, a first data packet that is a data packet comprising an ethernet header;
   determining that the first data packet has a compressed header including a compressed field;
   decompressing, in accordance with the determining, the compressed field of the compressed header of the first data packet to provide a decompressed field of the compressed header, wherein the decompressing is performed by a header decompression function operating at a packet data convergence protocol (PDCP) layer, and wherein the decompressing is performed according to a preset method, wherein the that comprises:
      adding complete content of a compressed field to the compressed header of the first data packet; or replacing a context identifier of the compressed header of the first data packet with the complete content of the compressed field, wherein the compressed field comprises a destination address field, a source address field and a length/type field.

5. The method according to claim 4, wherein the method further comprises:

receiving header context information of the first data packet, wherein the header context information comprises complete content of the compressed field.

6. The method according to claim 4, wherein the determining that the header of the first data packet is compressed comprises:

determining, based on third indication information, that the header of the first data packet is compressed, wherein the third indication information is comprised in the header of the first data packet and indicates the first data packet is a compressed data packet.

7. A sending device, comprising:

one or more processors, and a memory configured to store program instructions that, when executed by the one or more processors, cause the sending device to perform a method comprising:

determining a to-be-sent data packet that is a data packet comprising an ethernet header, wherein a header compression function for compressing a header of the to-be-sent data packet is carried out at a packet data convergence protocol (PDCP) layer, and wherein the header compression function is configured by a radio resource control (RRC) signaling;

determining a field to be compressed in the header of the to-be-sent data packet, wherein the field to be compressed comprises a destination address field, a source address field and a length/type field;

compressing the header of the to-be-sent data packet according to a preset method in the PDCP layer, wherein the preset method comprises:

removing the field to be compressed from the header of the to-be-sent data packet, or replacing the field to be compressed with a context identifier of the header of the to-be-sent data packet; and sending a data packet obtained after the compressing the header of the to-be sent data packet, wherein, before sending the data packet, the method further comprises:

receiving, from a receiving device, first feedback information for ethernet header context compression;

wherein sending a data packet comprises:

after receiving the first feedback information from the receiving device, start to transmit the to-be-sent data packet of which the header is compressed.

8. The sending device according to claim 7, wherein the method further comprises:

sending the header context information of the to-be-sent data packet to a receiving device, wherein the header context information comprises complete content of the field to be compressed.

9. The sending device according to claim 7, wherein a header of the data packet obtained after the compressing comprises third indication information indicating that the data packet is a compressed data packet.

10. A receiving device, comprising:

one or more processors, and a memory configured to store program instructions that, when executed by the one or more processors, cause the receiving device to perform a method comprising:

sending first feedback information to a sending device that indicates to the sending device to start to transmit a to-be-sent data packet of which the header is compressed;

receiving, after the sending, a first data packet that is a data packet comprising an ethernet header;

determining that the first data packet has a compressed header including a compressed field;

decompressing, in accordance with the determining, the compressed field of the compressed header of the first data packet to provide a decompressed field of the compressed header, wherein the decompressing is performed by a header decompression function operating at a packet data convergence protocol (PDCP) layer, and wherein the decompressing is performed according to a preset method that comprises:

adding complete content of a compressed field to the compressed header of the first data packet; or replacing a context identifier of the compressed header of the first data packet with the complete content of the compressed field, wherein the compressed field comprises a destination address field, a source address field and a length/type field.

11. The receiving device according to claim 10, wherein the method further comprises:

receiving header context information of the first data packet, wherein the header context information comprises complete content of the compressed field.

12. The receiving device according to claim 10, wherein the determining that the header of the first data packet is compressed comprises:

determining, based on third indication information, that the header of the first data packet is compressed, wherein the third indication information is comprised in the header of the first data packet and indicates the first data packet is a compressed data packet.

* * * * *

UNITED STATES PATENT AND TRADEMARK OFFICE
CERTIFICATE OF CORRECTION

| | | |
|---|---|---|
| PATENT NO. | : 11,956,667 B2 | Page 1 of 1 |
| APPLICATION NO. | : 17/214453 | |
| DATED | : April 9, 2024 | |
| INVENTOR(S) | : Xu et al. | |

It is certified that error appears in the above-identified patent and that said Letters Patent is hereby corrected as shown below:

In the Claims

Claim 1: Column 26, Line 29: "header of the to-be-sent data Packet," should read -- header of the to-be-sent data packet, --.

Claim 4: Column 26, Line 65: "to a preset method, wherein the that comprises:" should read -- to a preset method that comprises: --.

Signed and Sealed this
Sixth Day of August, 2024

Katherine Kelly Vidal
*Director of the United States Patent and Trademark Office*